Feb. 24, 1925.    1,527,426

T. R. COOK

STORAGE BATTERY

Filed May 11, 1918    2 Sheets-Sheet 1

Inventor:
Thomas R. Cook
By Thurston & Knox
attys.

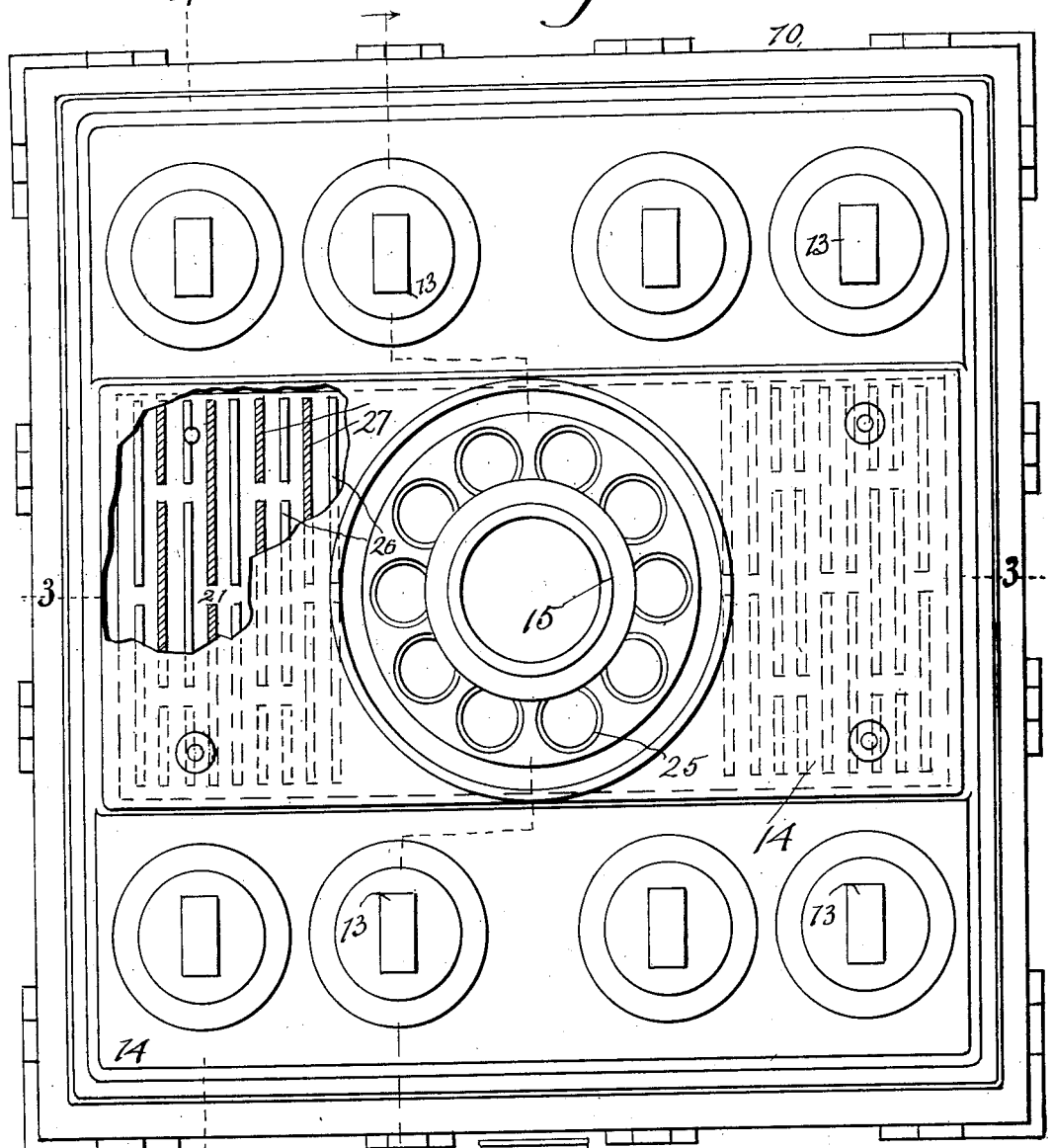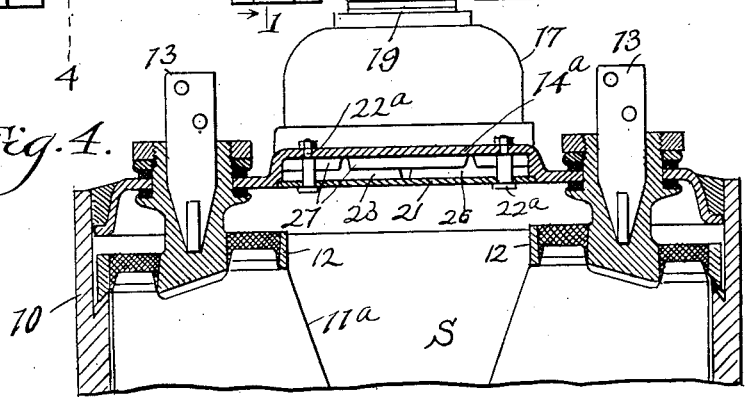

Patented Feb. 24, 1925.

1,527,426

UNITED STATES PATENT OFFICE.

THOMAS R. COOK, OF EAST CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

Application filed May 11, 1918. Serial No. 233,837.

*To all whom it may concern:*

Be it known that I, THOMAS R. COOK, a citizen of the United States, residing at East Cleveland, in the county of Cuyahoga and State of Ohio, have invented a certain new and useful Improvement in Storage Batteries, of which the following is a full, clear, and exact description.

The present invention relates to improvements in storage batteries, and has particular reference to the construction of the cover or top of the cell.

One of the objects is to provide a cover construction such that an efficient circulation of air currents may be obtained to cool the electrolyte and clear the cell of hydrogen and oxygen gases.

A further object is to accomplish this with a construction which avoids all inverted pockets in which the light hydrogen may collect, and also to construct the straps so that the gases evolved may readily pass from beneath the straps into the current of air passing through the top of the cell.

A still further object is to provide means whereby acid entrained with the ventilating and cooling air currents will be separated from the latter and returned to the ecll.

The above and other objects are accomplished by my invention which may be briefly summarized as consisting in certain novel details of construction and combinations and arrangements of parts which will be described in the specification and set forth in the appended claims.

Figure 1:
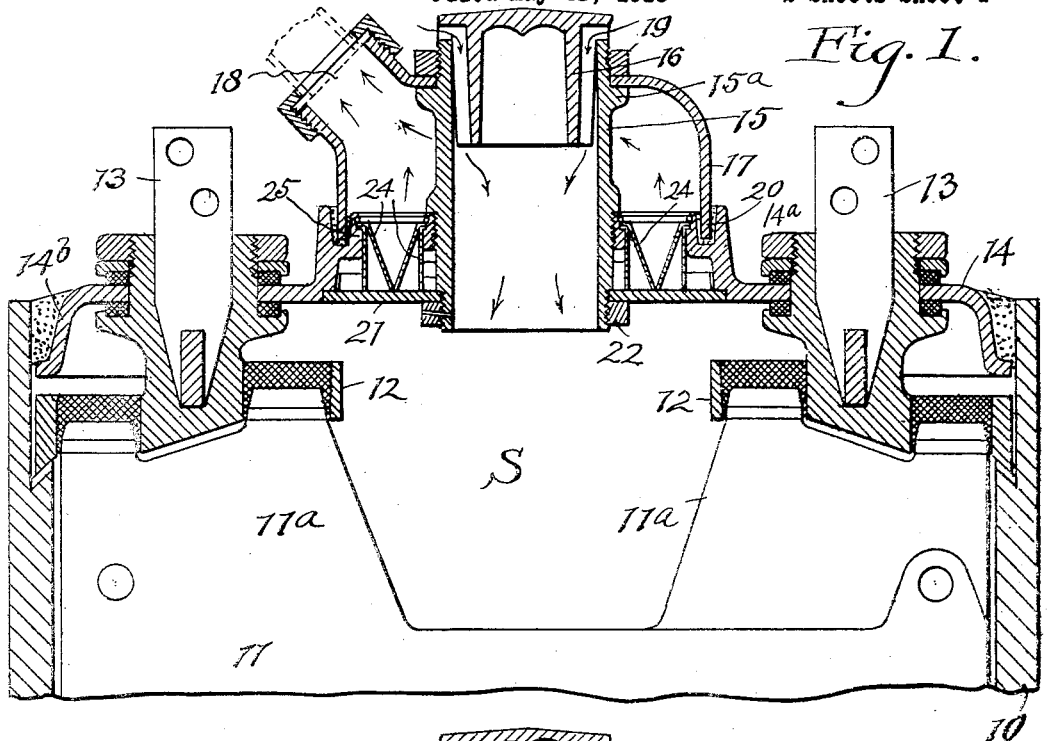
Figure 2:
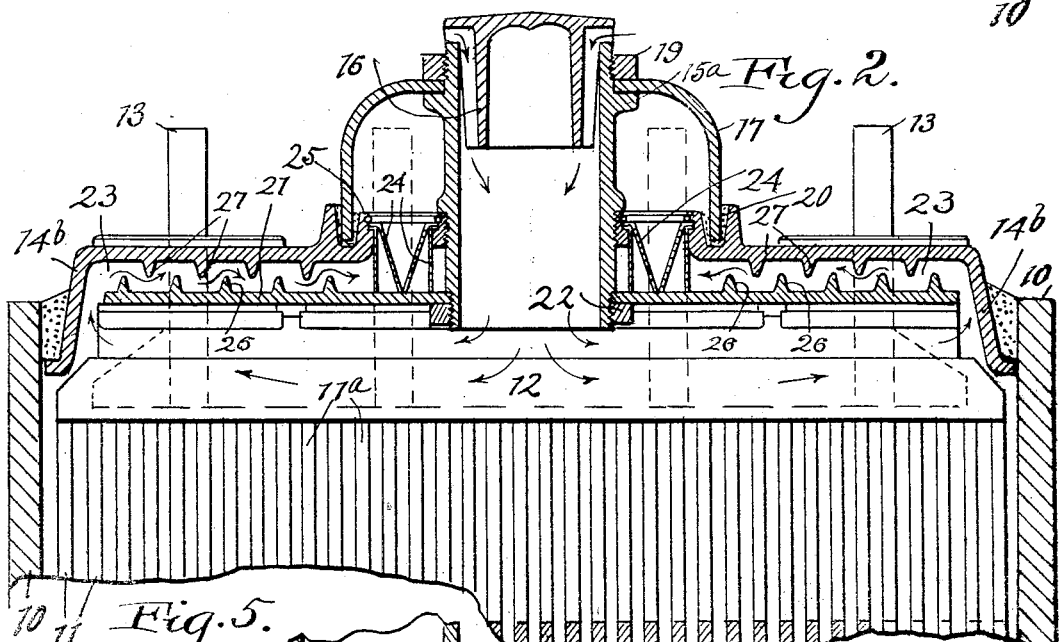
Figure 5:
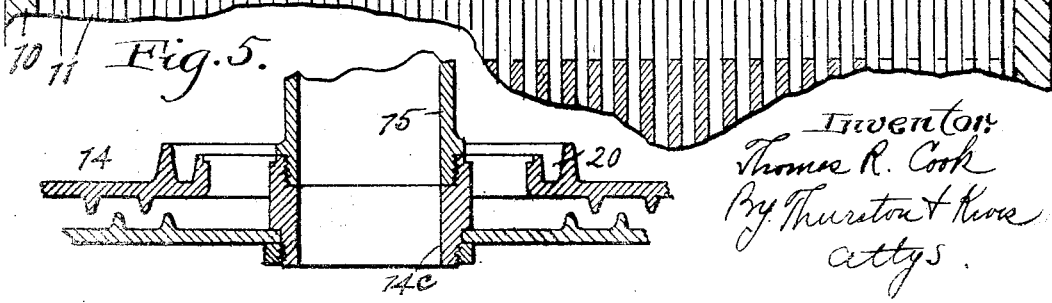

In the accompanying sheets of drawings wherein I have shown the preferred embodiment of my invention, Fig. 1 is a sectional view through the top of a cell of a battery equipped with my invention, the section being taken substantially along the irregular line 1—1 of Fig. 3, looking in the direction indicated by the arrows; Fig. 2 is a similar sectional view taken substantially along the line 3—3 of Fig. 3; Fig. 3 is a top plan view of the cell with the ventilating dome removed; Fig. 4 is a transverse sectional view on a reduced scale substantially along the line 4—4 of Fig. 3, looking in the direction indicated by the arrows; and Fig. 5 is a detail view showing a modification.

It is customary with certain storage batteries to pass air through the upper portions of the cells to cool the electrolyte and to carry away the gases which are evolved. This is true particularly of submarine batteries which are usually of large size.

It has been proposed to accomplish this by introducing air at one point of the cover of the cell and by sucking it out from the cell at another point, and one construction that has been proposed for this purpose includes a central tube serving as an air inlet and a dome which surrounds this tube, both the tube and the dome being in communication with the space inside the cover of the cell, and the dome having an outlet adapted to be connected to a suitable suction tube or pipe.

While the above mentioned features do not in themselves constitute the invention, the invention has particular utility with a construction such as referred to, and comprises certain improvements which increase the efficiency of that construction and very materially improves the cooling and ventilating effects.

Referring now to the drawings wherein the above mentioned improvements are shown in the best form now known to me, 10 represents the jar or container of the cell containing the usual positive and negative plates 11, which in this case (although not necessarily) are hung or supported from the top portion of the cell. Extending along the two opposite sides (or ends) of the upper part of the cell are the positive and negative straps 12—12, from which extend upwardly terminal posts 13, four of which are in this case connected to each strap, each terminal post projecting upwardly through a special cover 14.

The positive and negative plates are provided with upstanding lugs $11^a$ which are arranged alternately on opposite sides of the cell and are connected to the straps 12 in any approved manner such as by lead burning. Between the groups of lugs $11^a$ on both sides of the cell there is a fairly wide ventilating space S, extending crosswise of the cell. It should be observed in passing, that the straps 12 are not horizontal, but the inner portions next to the space S, are higher than the outer portions next to the side walls of the cell. This prevents the trapping of gas beneath the straps, but allows the gas to pass inwardly from between the lugs of the plates into the central transverse space S.

Secured in the cover is a vertical tube 15 which forms an air inlet tube, inspection tube and filling tube. This tube 15 is secured in an elevated portion 14ª of the cover, which elevated portion extends transversely across the cover between the two groups of terminal posts, as best shown in Figs. 3 and 4, and is directly above the space S. The tube 15 is partially closed by a plug 16 having a notched or grooved periphery between which and the tube air may be drawn and may pass downwardly through the tube into the space S, at the top of the cell above the electrolyte.

Surrounding the tube 15 is a dome 17 with an air outlet 18 to which a suction tube or pipe may be connected. The upper central part of the dome has an opening through which the upper part of the tube extends, and this part of the dome is clamped against an external flange 15ª of the tube by a nut 19. The lower part or bottom edge of the dome extends into an annular groove 20 in the elevated portion 14ª of the cover, and concentric with the tube, and the lower part of the dome is sealed in the groove by sealing material. This described method of securing and sealing the lower part of the dome is a novel feature of considerable importance for by this method the dome can be turned to any desired position with the outlet 18 projecting at the desired angle, and then can be tightly and effectively sealed without the necessity for a clamping nut and special gasket engaging the cover.

Another novel feature of considerable importance is a horizontal diaphragm 21, which is secured beneath the transverse elevated part 14ª of the cover, and requires the air to sweep from the central inlet tube lengthwise of the space S to the ends thereof before being permitted to enter the outlet dome 17. This diaphragm as will be observed particularly from Figs. 1 and 2, is clamped against the lower side of the cover which is suitably notched to receive the longitudinal edges of the diaphragm, directly beneath the elevated portion 14ª, the diaphragm being secured in place by a nut 22 screwed onto the lower end of the tube 15, and by bolts 22ª extending through the cover and diaphragm. The ends of the diaphragm are spaced slightly from the downturned marginal flange 14ᵇ of the cover, so that there is formed between the diaphragm and the superposed elevated part 14ª of the cover a space 23 which at its outer ends communicates with the circulation space S, between the lugs 11ª of the plates. The middle portion of this space 23 communicates with the interior of the dome through perforated outlet members or strainers 24 preferably of rubber, these members being seated in a series of circular openings 25 immediately surrounding the opening in the cover for the tube 15, as shown in Fig. 3.

It will be observed that the upper face of the diaphragm 21 and the lower face of the elevated part 14ª of the cover are provided with staggered lugs or ribs 26 and 27 respectively. The ribs preferably do not extend entirely across the diaphragm but are broken or are provided with staggered openings to permit the return flow of electrolyte which may have been entrained with the evolved gases, but which is separated from the air and gases in sweeping through the space 23 and the perforated outlet members 24.

With the battery constructed as above described air enters the vertical tube 15, passes downward into the center of the space S, and sweeps over the electrolyte lengthwise of the latter in both directions from the center and enters the space 23 above the diaphragm at the ends of the latter, and then passes inwardly toward the dome, and in so doing is baffled by the staggered ribs 26 and 27, and finally, the air passes through the perforated outlet members 24 into the dome 17 and out through the outlet boss 18. By reason of the fact that the air is required to sweep through practically the whole length of the middle space S, of the cell above the electrolyte, all the gases evolved are very effectively swept from the cell, especially as the gas is free to rise and to pass inwardly to the space S from beneath the straps 12, and since by this construction there are no inverted pockets below the diaphragm capable of receiving and holding the light hydrogen. As the air sweeps across the cell through the middle space S, not only is the battery ventilated but the electrolyte is effectively cooled, particularly if the electrolyte is caused to circulate from the bottom to the top of the cell, as in the method and by the means described in a companion application filed by me of even date herewith.

As the air travels in opposite directions through the space 23 toward the dome, the major portion of the electrolyte or acid carried along with the air and gases is deposited on the top of the diaphragm, and any remaining in the air is separated therefrom in passing through the perforated strainers 24. The electrolyte which is thus deposited on the diaphragm or in the strainers is free to flow to the ends of the diaphragm and drop back into the battery. To facilitate this return flow, the diaphragm may have a slight downward pitch from the middle toward its ends.

Instead of extending the air inlet tube 15 entirely through the cover and clamping the middle portion of the diaphragm to the lower end of the tube as shown in Figs. 1 and 2, the construction shown in Fig. 5 may be employed. As shown in this figure, the cover is provided at the center with a sleeve or flange 10° concentric with the groove which receives the lower end of the dome 17. The upper part of this flange is threaded internally and receives the lower end of the air inlet tube 15, which is somewhat shorter than in the preceding figures, and the lower end of the flange is threaded externally so that the middle portion of the diaphragm 21 may be clamped thereto by a clamping nut. With this construction which I regard as the equivalent of that first described, the central flange 10° forms a continuation of the tube so that the air is supplied to the cell in precisely the same manner as in the first described construction. However, the construction of Fig. 5 has the advantage that should the tube be broken, it can be removed and replaced with another tube without disturbing the diaphragm and without requiring the removal of the cover.

While I have shown the preferred constructions I do not wish to be confined to the precise details shown, but aim in my claims to cover all modifications which do not involve a departure from the spirit and scope of my invention in its broadest aspects.

Having described my invention, I claim:

1. In a storage battery, a cell having a cover with a central transverse elevated portion, a diaphragm or plate beneath said elevated portion, the cover and diaphragm being spaced apart and communicating near the margin of the cover with the space in the cell above the electrolyte and also having one or more air outlets, and the cover having an air inlet member communicating with the space in the cell above the electrolyte, the cover and diaphragm having projecting members for causing the deposit of electrolyte.

2. In a storage battery, a cell having a cover, a diaphragm or plate beneath said cover, there being a space between the cover and diaphragm, said space communicating with the space in the cell above the electrolyte near the margin of the cover and having one or more air outlets, and the cover having an air inlet member communicating with the space in the cell above the electrolyte, the cover and diaphragm having ribs projecting downwardly and upwardly therefrom respectively.

3. A storage battery comprising a cell having a cover, provided with an opening, means for causing a forced circulation of air through the space in the cell above the electrolyte, said means comprising an air inlet tube projecting through the opening in the cover, an air outlet dome surrounding the tube, the middle portion of the dome having an opening for the tube and being secured to the latter, and the cover having a groove upon the upper side thereof concentric with the opening therein and containing sealing material and the lower edge of the dome.

4. A storage battery comprising a cell containing positive and negative plates with upstanding lugs, straps extending along opposite sides of the cell and secured to said lugs, the inner portions of the straps being higher than the outer portions whereby gases evolved may readily pass upwardly and inwardly from beneath the straps to the upper central portion of the cell, and means for causing a forced circulation of air between the straps over the electrolyte.

5. In a storage battery, a cell containing positive and negative plates with upstanding lugs, straps extending across the cell on opposite sides thereof, one strap being secured to the positive plates, and the other strap being secured to the negative plates, and there being a well between the lugs and straps, the straps having their inner portions next to the well higher than their outer portions next to the sides of the cell, and means for causing a forced circulation of air transversely of the cell through said well.

In testimony whereof, I hereunto affix my signature.

THOMAS R. COOK.